(12) United States Patent
Kümmet et al.

(10) Patent No.: US 8,759,409 B2
(45) Date of Patent: Jun. 24, 2014

(54) LASER-INDUCED PLASTIC FOAMING

(75) Inventors: David Kümmet, Budenheim (DE); Rüdiger Wissemborski, Gau-Algesheim (DE); Hendrik Wermter, Eltville (DE); Rainer Schnee, Mainz (DE)

(73) Assignee: Chemische Fabrik Budenheim KG, Budenheim (DE)

( * ) Notice: Subject to any disclaimer, the term of this patent is extended or adjusted under 35 U.S.C. 154(b) by 0 days.

(21) Appl. No.: 13/635,103

(22) PCT Filed: Mar. 22, 2011

(86) PCT No.: PCT/EP2011/054295
§ 371 (c)(1),
(2), (4) Date: Nov. 26, 2012

(87) PCT Pub. No.: WO2011/117218
PCT Pub. Date: Sep. 29, 2011

(65) Prior Publication Data
US 2013/0065979 A1    Mar. 14, 2013

(30) Foreign Application Priority Data
Mar. 26, 2010  (DE) .......................... 10 2010 003 366

(51) Int. Cl.
*C08J 9/00*    (2006.01)
*C08G 61/04*   (2006.01)

(52) U.S. Cl.
USPC ................................ 521/50; 520/1

(58) Field of Classification Search
USPC ........................... 521/50, 1; 520/1
See application file for complete search history.

(56) References Cited

U.S. PATENT DOCUMENTS

| | | | |
|---|---|---|---|
| 3,627,858 A | 12/1971 | Parts et al. | |
| 4,507,346 A | 3/1985 | Maurer et al. | |
| 2004/0039072 A1* | 2/2004 | Park | 521/50 |
| 2004/0229966 A1* | 11/2004 | Dontula et al. | 521/50 |
| 2005/0029692 A1* | 2/2005 | Abe et al. | 264/45.5 |
| 2006/0014908 A1 | 1/2006 | Rotermund et al. | |

FOREIGN PATENT DOCUMENTS

| | | |
|---|---|---|
| EP | 0 965 611 | 12/1999 |
| JP | 2002-210773 | 7/2002 |
| WO | 2004/026792 | 4/2004 |
| WO | 2006/056485 | 6/2006 |

* cited by examiner

*Primary Examiner* — Ling Choi
*Assistant Examiner* — Jessica E Whiteley
(74) *Attorney, Agent, or Firm* — Drinker Biddle & Reath LLP

(57) ABSTRACT

A matrix material composed of polymer, preferably of thermoplastic polymer, or coating material. The matrix material includes 0.01 to 50% by weight of an additive for foaming of the matrix material which can be triggered by irradiation with laser light or IR light. The additive includes at least the following constituents: a) at least one absorber material which, embedded or dissolved in the matrix material, absorbs laser light or IR light and brings about local heating in the matrix material at the site of irradiation with laser light or IR light, and b) at least one blowing agent which, when heated due to the irradiation with laser light or IR light to temperatures above 50° C., forms a gas which foams the matrix material by decomposition, chemical conversion or reaction.

12 Claims, No Drawings

LASER-INDUCED PLASTIC FOAMING

CROSS REFERENCE TO RELATED APPLICATIONS

This application is a National Stage of International Application No. PCT/EP2011/054295 filed Mar. 22, 2011, which claims benefit of German Patent Application No. 10 2010 003 366.9 filed Mar. 26, 2010, both of which are herein incorporated by reference in their entirety.

SUBJECT OF THE INVENTION

The invention relates to a matrix material made of plastic, preferably made of thermoplastic polymer, or paint, varnish or lacquer, which contains an additive that makes it possible to trigger foaming of the matrix material by irradiation with laser light or IR light. Furthermore the invention relates to the composition of the additive and its use.

BACKGROUND OF THE INVENTION

The foaming of plastic parts by means of physical or chemical means is known. Blowing agents are mixed with or dissolved in the plastic, ensuring the production or release of gas in the plastic. However, such methods are limited as regards possibilities of triggering the foaming in a targeted, controlled and also locally limited manner. Until now it has also not been possible to produce discrete, patterned surface structures by foaming.

The foaming of plastic parts can serve various purposes, for example reducing the weight of the part, production of a thermally insulating part, production of sponges and other absorbent foams, production of floats or production of creative elements, ornaments or patterns.

A distinction is currently made between various foaming methods:

1. Physical methods, in which a gas is physically introduced into the molten plastic mass and expanded. The gas bubbles that form lead to foaming of the plastic. A disadvantage of this is the high outlay for apparatus and control engineering. The plastics processing machines, e.g. extruders, have to be converted for the foaming by means of a gas supply at great expense. The adjustment of the gas supply and control in connection with the melting behaviour of the plastic represents a further problem.
2. In the so-called dissolution method, plastic components are released from a solid plastic material by means of suitable solvents. This results in chambers and cavities which lead to a desired weight reduction. However, the method is questionable and problematic if for no other reason than that of environmental protection, as the solvents used, with the plastic components contained therein, pose significant problems of disposal or reprocessing.
3. In the past, CFC-containing products were chiefly used as blowing agents in chemical foaming processes. For reasons of environmental compatibility, these blowing agents are however to be avoided and replaced by other blowing agents. Diazo compounds, N-nitroso compounds, sulphohydrazides, urea derivatives, guanidine derivatives, boron hydride/water systems, carbonates and hydrogen carbonates are increasingly used. A disadvantage of the azo compounds is the production of large quantities of ammonia during degradation and during foam formation, which gives rise to concerns as regards a possible health risk. Many carbonates and hydrogen carbonates decompose without further additives in an uncontrolled manner when the decomposition temperature is reached. This results in uncontrolled foaming, and possibly unwanted discoloration and/or unwanted odour.
4. Foams can be produced very easily from polyurethane (PUR), which are known, amongst other things, as foam rubber, and are used as cleaning sponges, mattress materials or cushions, but also for thermal insulation in buildings, refrigerators, heat and cold storage units as well as for insulating pipe systems. For some time, further areas of application for polyurethane foams have been developed, for example in vehicle construction. Polyurethane foams which are provided for thermal insulation have a closed-pore construction so that the cell gases with their low thermal conductivities remain in the foam cells. In the past, trichlorofluoromethane was frequently used as the cell gas. Because of the ozone-depleting property of this halogenated hydrocarbon, it has however largely been replaced, first by carbon dioxide and then by cyclopentane, with the result that today the foam cells as a rule contain a mixture of approximately 10 to 30% cyclopentane and the remainder carbon dioxide.

Most blowing agents and foaming systems themselves or their reaction products are frequently harmful to the environment or to health and/or pose problems during processing or handling. Such a handling problem can for example be an uncontrollably rapid, exothermic or much too slow gas formation, which can result in either no correct foam formation at all taking place in the plastic parts or the foam structures not meeting the desired requirements, for example due to uneven pore formation, undesirable pore sizes (too large or too small), etc.

In the known systems the foaming takes place throughout the plastic material as a rule. For the production of patterns, writing or other design elements it would be desirable to be able to trigger the foaming in targeted, controlled and also locally limited manner.

In the field of plastic processing or working, the use of NIR/IR radiation (heat radiation) by means of lasers or other radiation sources is known. This radiation is used both for plastic welding and for marking and labelling plastics. NIR/IR radiation sources are also used for the targeted heating of plastic materials, e.g. in the PET bottle production process, so-called PET bottling, or in the drawing of films or in the so-called deep drawing process for the production of cups. The use of NIR/IR radiation to produce heat is very efficient, as the heat energy can be applied in a very targeted manner and with lower losses than for example in conventional convection ovens. It is thus possible to achieve shorter process times and more targeted energy use. In the case of varying material thicknesses of the workpieces to be heated, NIR/IR radiation sources offer significantly better heating possibilities as the output can be regulated better and faster.

OBJECT

The object of the present invention was to provide a foamable matrix material made of plastic or paint, varnish or lacquer, in which the foaming and the gas formation can be better controlled than in the case of known systems and in which it is possible to trigger the foaming in targeted, controlled and also locally limited manner, in order for example to produce discrete patterned surface structures, decoration or writing.

DESCRIPTION OF THE INVENTION

The object according to the invention is achieved by a matrix material made of plastic, preferably made of thermoplastic polymer, or paint, varnish or lacquer, which contains 0.01 to 50 wt. % of an additive for foaming of the matrix material which can be triggered by irradiation with laser light or IR light, wherein the additive comprises at least the following constituents:

a) at least one absorber material which, embedded or dissolved in the matrix material, absorbs laser light or IR light and brings about local heating in the matrix material at the site of the irradiation with laser light or IR light, and
b) at least one blowing agent which, when heated due to the irradiation with laser light or IR light to temperatures above 50° C., produces, by decomposition, chemical conversion or reaction, a gas foaming the matrix material.

An essential aspect of the present invention is the combination of an absorber material which absorbs laser light or IR light, and thus concentrates energy locally and thereby brings about local heating in the matrix material at the site of the irradiation, with a blowing agent which, when heated due to the irradiation with the laser light or IR light, produces a gas foaming the matrix material. The local heating in the matrix material at the site of the irradiation with the laser light or IR light, besides the triggering of the foaming of the blowing agent, has the additional function of softening the thermoplastic matrix material and thereby only then allowing the foaming of the material. If the blowing agent begins producing gas in the solid matrix material, depending on the stability of the matrix material and intensity of the gas production either the gas will not expand and will remain trapped in the matrix material or it will break open and partially destroy the solid matrix material by the gas expansion. The local softening of the matrix material by heating at the site of the irradiation however allows the desired targeted foam formation.

Substantially all the substances and substance compositions which can be introduced into the matrix material and produce a foaming gas when heated are suitable as blowing agents in the additive of the present invention. These can be substances which decompose or react directly on heating, accompanied by gas production. They can, however, also be substances with which gas production is initiated by triggers other than heating alone, for example by reaction with another substance which is caused to react with the actual gas-producing substance only by heating, or by a change in the pH in proximity to the gas-producing substance, wherein the change in pH can be brought about by heating. The reaction mechanisms of the gas production from the blowing agent are not limited to these examples.

In an embodiment of the invention the blowing agent is selected from the following:
i) carbon dioxide carriers which produce $CO_2$ gas during decomposition and/or reaction with at least one other substance,
  selected from carbonates, hydrogen carbonates and carbamates of the alkali metals, alkaline earth metals, aluminium, transition metals and/or ammonium, preferably selected from sodium carbonate, sodium hydrogen carbonate, magnesium carbonate, magnesium hydrogen carbonate, calcium carbonate, calcium hydrogen carbonate, aluminium carbonate, aluminium hydrogen carbonate, iron carbonate, iron hydrogen carbonate, ammonium carbonate, ammonium hydrogen carbonate, ammonium carbamate, and mixtures of the above,
ii) carbon dioxide carriers in combination with acid carriers which produce $CO_2$ gas during decomposition and/or reaction, wherein the carbon dioxide carrier is selected from the compounds given under i) and the acid carrier is selected from
  salts of phosphorus-containing oxoanions, preferably from phosphates, condensed phosphates, phosphonates, phosphites, mixed hydroxide phosphates and cyanurates,
  particularly preferably selected from sodium acid pyrophosphate (SAPP), monocalcium phosphate monohydrate (MCPM), dicalcium phosphate dihydrate (DCPD), sodium aluminium sulphate (SAS), sodium aluminium phosphate (SALP), calcium magnesium aluminium phosphate, calcium polyphosphate, magnesium polyphosphate and mixtures of the above,
iii) compounds which produce at least $N_2$ gas during decomposition, preferably selected from azo compounds, hydrazides, semicarbazides, triazols, tetrazols, N-nitroso compounds, benzoxazines,
iv) compounds which produce carbon dioxide and water during decomposition and/or reaction with at least one other substance,
  preferably selected from organic carboxylic acids and salts thereof, preferably citric acid, citrate, fumaric acid and fumarate, and
v) combinations and mixtures of the above.

Substantially all the substances and substance compositions which can be introduced into the matrix material and which absorb laser light or IR light, locally concentrate the energy of the laser light or IR light and in the process bring about heating at the site of the irradiation are suitable as absorber materials in the additive of the present invention. It is understood that the absorber material or the combination of absorber material and matrix material has to be chosen such that it has a higher absorption for the laser light or IR light of a specific wavelength and/or energy used than the matrix material alone.

In an embodiment of the invention the absorber material is selected from the following:
i) phosphates, condensed phosphates, phosphonates, phosphites and mixed hydroxide-phosphate-oxoanions of metals which are selected from the elements of the 3rd to 6th period of main groups II and III, of the 5th to 6th period of main group IV and of the 4th to 5th period of sub-groups III to VIII and the lanthanides of the periodic table of the elements, preferably Cu, Sn, Ca, Mo, Fe, Co, Sn,
  more preferably from copper phosphates, tin phosphates, iron phosphates, nickel phosphates, molybdenum phosphates, cobalt phosphates, manganese phosphates and antimony phosphates,
  particularly preferably from copper phosphates, tin phosphates and iron phosphates,
  quite particularly preferably copper-hydroxide phosphate [CHP; $Cu_4(OH)_2(PO_4)_2$],
ii) metal oxides and mixed metal oxides, preferably from antimony oxide (Sb2O3), tin oxide (SnO4), titanium oxide (TiO2), indium tin oxide (In2O3/SnO2; ITO), antimony tin oxide (ATO),
iii) platelike pigments of metal, preferably of Al, Cr, Fe, Au or Ag, uncoated or covered with one or more metal oxide layers, wherein the metal oxide is preferably selected from titanium dioxide, antimony(III) oxide, zinc oxide, tin oxide, zirconium dioxide, chromium oxide, nickel oxide, copper oxide, cobalt oxide, iron oxide ($Fe_2O_3$, $Fe_3O_4$), particularly preferably from antimony(III) oxide alone or in combination with tin oxide,
iv) organic absorbers, preferably organic NIR-absorbers, particularly preferably phthalocyanines and naphthalocyanines, in particular copper(II)-1,4,8,11,15,18,22,25-octabutoxy-29H,31H-phthalocyanine or vanadyl-2,9,16,23-tetraphenoxy-29H,31H-phthalocyanine or vanadyl-5,14, 23,32-tetraphenyl-2,3-naphthalocyanine or vanadyl-2,11, 20,29-tetra-tert-butyl-2,3-naphthalocyanine, lumogens and quaterrylene dyes.

In a further embodiment of the invention the absorber material is selected such that it absorbs laser light in the wavelength range for ultraviolet radiation (UV) of 100 to 400 nm, for example excimer lasers, or laser light in the wavelength range of 9000 to 11000 nm, for example $CO_2$ lasers, or it absorbs laser light or IR light in the wavelength range of 700 to 2000 nm, preferably 950 to 1500 nm.

According to the invention the matrix material made of plastic or paint, varnish or lacquer contains the additive in a quantity of 0.01 to 50 wt. %. In a further embodiment of the invention the matrix material contains 1.0 to 30 wt. % of the additive or 3.0 to 20 wt. % of the additive or 5.0 to 10 wt. % of the additive relative to the weight of the matrix material.

The matrix material can be a polymer material (plastic) or a paint, varnish or lacquer. Preferably, it is a thermoplastic polymer. In a further embodiment of the invention, the matrix material is selected from the group consisting of polyvinylbutyral (PVB), polypropylene (PP), polyethylene (PE), polyamide (PA), polybutylene terephthalate (PBT), polyethylene terephthalate (PET), polyester, polyphenylene oxide, polyacetal, polymethacrylate, polyoxymethylene, polyvinylacetal, polystyrene, acryl-butadiene-styrene (ABS), acrylonitrile-styrene-acrylester (ASA), polycarbonate, polyether sulphone, polyether ketone, polyvinyl chloride, thermoplastic polyurethane and/or copolymers and/or mixtures thereof.

The invention also comprises the additive described above, for a matrix material made of plastic or paint, varnish or lacquer as such, namely an additive for a foaming of the matrix material which can be triggered by irradiation with laser light or IR light, wherein the additive comprises at least the following constituents:
a) at least one absorber material which, embedded or dissolved in the matrix material, absorbs laser light or IR light and brings about local heating in the matrix material at the site of the irradiation with laser light or IR light, and
b) at least one blowing agent which, when heated due to the irradiation with laser light or IR light to temperatures above 50° C., produces, by decomposition, chemical conversion or reaction, a gas foaming the matrix material.

The invention furthermore also comprises the use of an additive of the type according to the invention described above, for the production of a matrix material made of plastic or paint, varnish or lacquer which can be provided with foamed structures at the surface by means of laser light or IR light, preferably with Braille script, and/or for the production of a material which can be welded by means of laser light or IR light.

The laser welding of plastics which contain absorber materials for the laser light or IR light used is known, however the problem with these methods is that, between the plastic parts to be welded, cracks or gaps can form or remain, in which no contact is produced between the plastic parts whereby the weld joint can be incomplete and unstable. By contrast, with laser welding of plastic parts according to the invention, with melting at the weld joints, the cracks and gaps are advantageously filled in due to the foaming and a full-surface weld joint is ensured.

0.01 to 50 wt. % of the additive or 1.0 to 30 wt. % of the additive or 3.0 to 20 wt. % of the additive or 5.0 to 10 wt. % of the additive relative to the weight of the matrix material is expediently added to the matrix material.

A person skilled in the art with knowledge of the invention can, by means of a few tests, ascertain the optimum composition and quantity of the additive which is to be introduced into a plastic matrix for targeted foaming in the case of a given plastic material. The composition and quantity of the additive will depend, among other things, on the plastic material used and to be foamed, and on the desired foaming result taking into account the foaming conditions to be applied and the laser to be used. The additive according to the invention suitably contains the blowing agent and the absorber in a weight ratio of 20:1 to 1:20, preferably 15:1 to 1:15, particularly preferably 10:1 to 1:10, further preferably 5:1 to 1:5 or 3:1 to 1:3. As the absorber material is the more expensive material as a rule, the absorber will expediently be used in a smaller quantity than the blowing agent.

The additive is preferably selected or composed such that it does not yet react or decompose with formation of gas below a specific temperature and in particular at room temperature. The release of gas is to take place only at increased temperature which is brought about by the irradiation with the laser light or IR light. With the additive according to the invention or the matrix composition according to the invention the release of gas from the blowing agent or the blowing agent composition will expediently take place at a temperature within the range of 80 to 400° C., preferably 110 to 350° C., particularly preferably 140 to 300° C.

The properties and the reactivity of the blowing agent in the additive can be influenced by further additives. In further embodiments of the invention the additive can for example contain means for preventing or delaying the premature reaction of the blowing agent, wherein the means is preferably selected from cereal starch, such as for example cornstarch, rice starch or wheat starch, modified flours, silicon dioxide, such as for example pyrogenic silica, hydrophobic silica or hydrophilic silica, tricalcium phosphates, calcium carbonate, calcium sulphate, silanes, fats and mixtures of the above. Not only can the premature reaction of the blowing agent be prevented or delayed by the addition of such means, but the speed of reaction in the plastic matrix can also be influenced.

The introduction of the additive into plastic matrix material can expediently be carried out via a so-called masterbatch. By the term masterbatch is meant additives embedded in a plastic matrix in the form of granules, in which the additives are present in concentrations which are higher than in the end-application. They are mixed with the plastic (raw polymer) for colouring or for changing the properties. Compared with the addition of different substances in the form of pastes, powders or liquids, masterbatches have the advantage that they guarantee a high process reliability and are very easy to work with. With a masterbatch, it is usually endeavoured to concentrate the additive as much as possible, i.e. to use as little plastic matrix material as possible, in order to embed the additive or additives. For the production of a masterbatch the additives, e.g. also colour pigments, are mixed with raw polymer, i.e. untreated plastic granules. This mixture is then melted in an extruder and then granulated. Alternatively the components can also be mixed directly in the extruder via different weigh feeders and melted. A masterbatch allows simple handling due to good controllability.

In the case of the preparation of the foaming agent according to the invention in a masterbatch it must be ensured that the melting temperature of the polymer carrier material for the masterbatch is not higher than the decomposition or reaction temperature of the blowing agent. Low-melting polymers, such as e.g. polyethylene, in particular LDPE or LLDPE and EVA, are therefore preferably used for the masterbatch here.

Matrix materials particularly preferred according to the invention are thermoplastic polymers, for example polyolefins, such as polyethylene, polypropylene, polybutylene, polymethylpentene as well as block, graft and copolymers thereof, styrene polymers, such as standard polystyrene, impact-resistant polystyrene, styrene acrylonitrile, acrylonitrile butadiene styrene, acrylonitrile styrene, acrylic rubber, halogen-containing vinyl polymer, such as polyvinyl chloride, polyvinylidene chloride, polyvinyl fluoride, tetrafluoromethylene hexafluoromethylene copolymer, ethylene tetrafluoroethylene copolymer, polychlorotrifluoroethylene, ethylene chlorotrifluoroethylene copolymer, acryl polymers, polyacrylate, polymethacrylate, polyacetals, such as polyoxymethylene, linear polycondensates such as polyamides (PA-6,PA-66,PA-610,PA-612,PA-11,PA-12 etc.), polycarbonates, polyesters (e.g. polyethylene terephthalate, polybutylene terephthalate etc.), polyimides, polyarylketones, polysulphones, polyurethanes, polyphenylenes, polymers of unsaturated alcohols and amines or acyl derivatives or acetals thereof, such as polyvinyl alcohol, polyvinyl acetates, polyvinyl butyral, polyvinyl benzoate, cross-linked polycondensates and polyadducts, such as phenoplasts, aminoplasts, epoxy resins, unsaturated polyesters, polyurethane, modified naturally occurring substances, such as cellulose ester, including copolymers or mixtures of the above-named polymers.

In addition to plastics or thermoplastic polymers, any types of paints, varnishes or lacquers which are described below are also suitable according to the invention as matrix materials.

One-component paints, varnishes (1C varnishes) or lacquers contain binding agents in the form of a dispersion in aqueous solution or dissolved in the solvent. In the case of two-component paints, varnishes (2C varnishes) or lacquers the binding agent consists of resin and hardener. These are stored separately and mixed together shortly before processing. They react chemically and cure (without drying). Many 2C paints, varnishes or lacquers contain no solvents. Binding agents include natural resins and oils (oil paint), plant constituents (Chinese varnish, Japanese varnish), egg (egg tempera), gum arabic (watercolour), lime (limewash), glue (distemper), tar or bitumen.

If the binding agent is not present in liquid form, a solvent which is capable of dissolving the binding agent is required as additional constituent. Solvents in physically drying varnishes are as a rule colourless, must not negatively influence the binding agent and evaporate leaving no residue. Most solvents for varnishes are organic solvents. However, solvent-free systems are also used, such as powder coatings or suspensions of varnish particles in water. After application of the varnish and drying, film formers form a cohesive layer (the film) with good chemical and mechanical properties. In the course of drying, varnish curing, the film formers change to high-molecular compounds. Low-molecular film formers are e.g. nitrocellulose, vinyl chloride-vinyl acetate copolymers, high-molecular film formers are for example unsaturated polyester resins, epoxy resins.

Paints, varnishes or lacquers suitable according to the invention include oil paints, varnishes or lacquers, cellulose nitrate paints, varnishes or lacquer, alkyd resin paints, varnishes or lacquers, polyvinyl ester paints, varnishes or lacquers, such as dispersions of polyvinyl acetate, acrylic resin paints, varnishes or lacquers, such as polyacrylate paints, varnishes or lacquers and polymethacrylate paints, varnishes or lacquers, silicon resin paints, varnishes or lacquers, epoxy resin paints, varnishes or lacquers and polyurethane paints, varnishes or lacquers.

EXAMPLES

The invention is now explained in more detail by means of embodiment examples.

Example 1 low-density polyethylene (LDPE) was extruded with 2 wt. % of a mixture of disodium dihydrogen diphosphate and an equimolar portion of sodium hydrogen carbonate and 1 wt. % copper hydroxide phosphate. A ZSK 18 extruder from Coperion was used. The polymer material obtained was labelled with a sequence of letters by means of an NdYAG laser beam source (1064 nm). Foaming on the surface produced tactile writing with a height from the surface of 0.5 mm.

Example 2

200 g of a polyamide 6 (PA6) was melted in a Brabender mixer and 2 wt. % (4 g) of a blowing agent mixture made up of monocalcium dihydrogen monophosphate and an equimolar quantity of calcium carbonate was added and mixed for another 30 seconds. 2 wt. % of an NIR absorber based on a mica was then added. The mixer was then stopped and the plastic taken out. The polymer material obtained was irradiated by means of an NdYAG-laser beam source (1064 nm) with a pattern in the form of writing. A tactile writing height of 0.5 mm from the surface was achieved in the process.

Example 3

A preform made of polypropylene (PP) with 0.5 wt. % of a blowing agent based on a sodium citrate in combination with a calcium carbonate and an additional 0.1 wt. % absorber based on a metal phosphate was heated by means of an IR lamp to the melting point of the polymer. In the process, a foaming process was triggered. A foamed surface was produced with clearly improved thermal insulation properties compared with the unfoamed material.

The invention claimed is:
1. An additive for a matrix material made of plastic or paint, varnish or lacquer for a foaming of the matrix material which can be triggered by irradiation with laser light or IR light, wherein the additive comprises at least the following constituents:
   a) at least one absorber material which, when embedded or dissolved in the matrix material, absorbs laser light or IR light and brings about local heating in the matrix material at the site of the irradiation with laser light or IR light, and
   b) at least one blowing agent which, when heated due to the irradiation with laser light or IR light to temperatures above 50° C., produces, by decomposition, chemical conversion or reaction, a gas which foams the matrix material,
   wherein the at least one blowing agent is at least one carbon dioxide carrier in combination with at least one acid carrier which produce $CO_2$ gas during decomposition and/or reaction, wherein the carbon dioxide carrier is selected from the group consisting of carbonates, hydrogen carbonates, and carbamates of the alkali metals, alkaline earth metals, aluminum, transition metals and ammonium, and mixtures of the above, and the acid carrier is selected from the group consisting of phosphates, condensed phosphates, phosphonates, phosphi- tes, mixed hydroxide phosphates, and cyanurates, carboxylic acids and salts thereof, and mixtures of the above, and wherein the at least one absorber material is selected from the group consisting of the following:

i) phosphates, condensed phosphates, phosphonates, phosphites and mixed hydroxide-phosphate-oxoanions of metals which are selected from the group consisting of the elements of the 3rd to 6th period of main groups II and III, of the 5th to 6th period of main group IV and of the 4th to 5th period of sub-groups III to VIII and the lanthanides of the periodic table of the elements, ii) platelike pigments of metal selected from the group consisting of Al, Cr, Fe, Au and Ag, uncoated or covered with one or more metal oxide layers, wherein the metal oxide is selected from the group consisting of titanium dioxide, antimony(III) oxide, zinc oxide, tin oxide, zirconium dioxide, chromium oxide, nickel oxide, copper oxide, cobalt oxide, and iron oxide ($Fe_2O_3$, $Fe_3O_4$), and iii) organic absorbers selected from the group consisting of phthalocyanines and naphthalocyanines.

2. The additive according to claim 1, wherein the at least one
carbon dioxide carrier is carriers which produce $CO_2$ gas during decomposition and/or reaction with at least one other substance, selected from the group consisting of sodium carbonate, sodium hydrogen carbonate, magnesium carbonate, magnesium hydrogen carbonate, calcium carbonate, calcium hydrogen carbonate, aluminium carbonate, aluminium hydrogen carbonate, iron carbonate, iron hydrogen carbonate, ammonium carbonate, ammonium hydrogen carbonate, and ammonium carbamate, and mixtures of the above.

3. The additive according to claim 1, wherein the at least one absorber material is selected from the group consisting of the following:

i) phosphates, condensed phosphates, phosphonates, phosphites and mixed hydroxide-phosphate-oxoanions of metals which are selected from the group consisting of copper phosphates, tin phosphates and iron phosphates, including copper-hydroxide phosphate [CHP; $Cu_4(OH)_2(PO4)_2$], ii) plate like pigments of metal, selected from the group consisting of Al, Cr, Fe, Au, and Ag, uncoated or covered with one or more metal oxide layers, wherein the metal oxide is selected from antimony(III) oxide alone or in combination with tin oxide, iii) organic NIR-absorbers, selected from the group consisting of copper(II)-1,4,8,11,15,18,22,25-octabutoxy-29H,31H-phthalocyanine; vanadyl-2,9,16,23-tetraphenoxy-29H,31H-phthalocyanine; vanadyl-5,14,23,32-tetraphenyl-2,3-naphthalocyanine; vanadyl-2,11,20,29-tetra-tert-butyl-2,3-naphthalocyanine, lumogens and quaterrylene dyes.

4. The additive according to claim 1 containing the at least one blowing agent and the at least one absorber material in a weight ratio of 20:1 to 1:20.

5. A method of using the additive according to claim 1, comprising the step of producing a matrix material made of plastic or paint, varnish or lacquer, and the additive, wherein the matrix material can be provided with foamed structures at the surface by means of laser light or IR light and/or for the production of a material which can be welded by means of laser light or IR light.

6. The method according to claim 5, wherein 0.01 to 50 wt. % of the additive or 1.0 to 30 wt. % of the additive or 3.0 to 20 wt. % of the additive or 5.0 to 10 wt. % of the additive relative to the weight of the matrix material is added to the matrix material.

7. The additive according to claim 1, containing the at least one blowing agent and the at least one absorber material in a weight ratio of 10:1 to 1:10.

8. The additive according to claim 1, containing the at least one blowing agent and the at least one absorber material in a weight ratio of 5:1 to 1:5.

9. The additive according to claim 1, wherein the at least one absorber material absorbs laser light in the wavelength range for ultraviolet radiation (UV) of 100 to 400 nm, for example excimer lasers, or laser light in the wavelength range of 9000 to 11000 nm, for example $CO_2$ lasers, or absorbs laser light or IR light in the wavelength range of 700 to 2000 nm.

10. The additive according to claim 1, being provided for a matrix material made of plastic selected from the group consisting of polyvinyl butyral (PVB), polypropylene (PP), polyethylene (PE), polyamide (PA), polybutylene terephthalate (PBT), polyethylene terephthalate (PET), polyester, polyphenylene oxide, polyacetal, polymethacrylate, polyoxymethylene, polyvinyl acetal, polystyrene, acryl-butadiene-styrene (ABS), acrylonitrilestyrene-acrylester (ASA), polycarbonate, polyethersulphone, polyetherketone, polyvinyl chloride, and thermoplastic polyurethane, and copolymers and mixtures thereof.

11. The additive according to claim 1, wherein the acid carrier is selected from the group consisting of sodium acid pyrophosphate (SAPP), monocalcium phosphate monohydrate (MCPM), dicalcium phosphate dihydrate (DCPD), sodium aluminium sulphate (SAS), sodium aluminium phosphate (SALP), calcium magnesium aluminium phosphate, calcium polyphosphate, and magnesium polyphosphate, citric acid, citrate, fumaric acid, and fumarate, and mixtures of the above.

12. The method according to claim 5, wherein the matrix material is provided with foamed structures at the surface with Braille script. added to the matrix material.

* * * * *